(12) United States Patent
Suzuki

(10) Patent No.: US 11,006,243 B2
(45) Date of Patent: May 11, 2021

(54) GUIDANCE DEVICE, GUIDANCE METHOD, AND STORAGE MEDIUM

(71) Applicant: HONDA MOTOR CO., LTD., Tokyo (JP)

(72) Inventor: Kosuke Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/745,471

(22) Filed: Jan. 17, 2020

(65) Prior Publication Data
US 2020/0236501 A1  Jul. 23, 2020

(30) Foreign Application Priority Data

Jan. 22, 2019 (JP) .............................. JP2019-008516

(51) Int. Cl.
*H04W 4/024* (2018.01)
*H04W 4/02* (2018.01)
*H04W 4/029* (2018.01)

(52) U.S. Cl.
CPC .......... *H04W 4/024* (2018.02); *H04W 4/027* (2013.01); *H04W 4/029* (2018.02)

(58) Field of Classification Search
CPC ...... H04W 4/024; H04W 4/029; H04W 4/027
See application file for complete search history.

(56) References Cited

U.S. PATENT DOCUMENTS

| | | | | |
|---|---|---|---|---|
| 2004/0030832 A1* | 2/2004 | Squibbs | ............. | G06F 12/0886 711/118 |
| 2011/0046878 A1* | 2/2011 | Sung | ................. | G01C 21/3647 701/467 |
| 2013/0054132 A1* | 2/2013 | Conner | ............. | G01C 21/3691 701/411 |
| 2014/0013136 A1* | 1/2014 | Dadu | ................... | G06F 1/3209 713/323 |
| 2014/0162687 A1* | 6/2014 | Edge | ................... | H04L 12/1845 455/456.1 |
| 2017/0219360 A1* | 8/2017 | Cui | ......................... | G01S 19/39 |

FOREIGN PATENT DOCUMENTS

JP   2017-126179   7/2017

* cited by examiner

*Primary Examiner* — Dinh Nguyen
(74) *Attorney, Agent, or Firm* — Amin, Turocy & Watson, LLP

(57) ABSTRACT

A guidance device of an embodiment includes a first acquirer configured to acquire first mobile body movement information of a first mobile body from a reference position to a first position, a second acquirer configured to acquire a second mobile body movement history including a movement history including the first position in a movement history of a second mobile body, and an information provision controller configured to cause an output to output guidance information directed to a user of the first mobile body on the basis of the first mobile body movement information and the second mobile body movement history.

12 Claims, 12 Drawing Sheets

| POSITION INFORMATION | | LINK ID | POI-ID | INFORMATION ID | PROVISION PERIOD INFORMATION | | GUIDANCE CONTENT |
| --- | --- | --- | --- | --- | --- | --- | --- |
| LATITUDE | LONGITUDE | | | | START DATE AND TIME | END DATE AND TIME | |
| *** | *** | R5 | P001 | I501 | 2000-04-01 07:00:00 | 2099-04-01 07:00:00 | THERE IS AAA LIBRARY |
| *** | *** | R6 | P002 | I601 | 2015-10-01 00:00:00 | 2099-04-01 07:00:00 | THERE IS BBB STORE |
| *** | *** | R6 | P002 | I602 | 2018-12-15 10:00:00 | 2018-12-16 18:00:00 | WEEKEND SALE IS IN PROGRESS |
| ... | ... | ... | ... | ... | ... | ... | ... |

| VEHICLE ID | ROUTE ID | DATE AND TIME | DAY OF WEEK | WEATHER | POSITION INFORMATION | | LINK ID |
|---|---|---|---|---|---|---|---|
| | | | | | LATITUDE | LONGITUDE | |
| V010 | VT010 | *** | TUESDAY | CLOUDY | *** | *** | R1 |
| | VT010 | *** | TUESDAY | CLOUDY | *** | *** | R1 |
| | VT010 | *** | TUESDAY | CLOUDY | *** | *** | R2 |
| | ⋮ | ⋮ | ⋮ | ⋮ | ⋮ | ⋮ | ⋮ |
| V050 | VT050 | *** | SUNDAY | SUNNY | *** | *** | R10 |
| | VT050 | *** | SUNDAY | SUNNY | *** | *** | R10 |
| | ⋮ | ⋮ | ⋮ | ⋮ | ⋮ | ⋮ | ⋮ |
| ⋮ | | | | | | | |

| ROUTE ID | DATE AND TIME | DAY OF WEEK | WEATHER | POSITION INFORMATION | | LINK ID |
|---|---|---|---|---|---|---|
| | | | | LATITUDE | LONGITUDE | |
| VT001 | *** | TUESDAY | CLOUDY | *** | *** | R1 |
| | *** | TUESDAY | CLOUDY | *** | *** | R1 |
| | *** | TUESDAY | CLOUDY | *** | *** | R2 |
| VT002 | *** | WEDNESDAY | RAINY | *** | *** | R1 |
| ... | ... | | | ... | ... | ... |

GUIDANCE DEVICE, GUIDANCE METHOD, AND STORAGE MEDIUM

CROSS-REFERENCE TO RELATED APPLICATION

Priority is claimed on Japanese Patent Application No. 2019-008516, filed Jan. 22, 2019, the content of which is incorporated herein by reference.

BACKGROUND

Field of the Invention

The present invention relates to a guidance device, a guidance method, and a storage medium.

Description of Related Art

In the related art, a technology for determining a usage rate of first route information that is used when predicting a travel route, on the basis of a previous driving record at a current position of a first vehicle using the first route information indicating a route of the first vehicle and second route information indicating a route of a second vehicle among travel route information collected from a plurality of vehicles, and predicting a travel route of the first vehicle on the basis of the determined usage rate is known (for example, Japanese Unexamined Patent Application, First Publication No. 2017-126179).

However, in the related art, since travel histories of all vehicles are used as travel route information, travel histories of other vehicles that simply only pass through positions or areas in which the host vehicle is traveling are also used for route prediction. Therefore, appropriate route prediction cannot be performed, and as a result, appropriate guidance information directed to a user based on the route cannot be provided in some cases.

SUMMARY

An aspect of the present invention has been made in view of such circumstances, and an object of the present invention is to provide a guidance device, a guidance method, and a storage medium capable of providing more appropriate guidance information to a user.

The following configuration is adopted for the guidance device, the guidance method, and the storage medium according to the present invention.

(1) A guidance device according to an aspect of the present invention is a guidance device including a first acquirer configured to acquire first mobile body movement information of a first mobile body from a reference position to a first position; a second acquirer configured to acquire a second mobile body movement history including a movement history including the first position in a movement history of a second mobile body; and an information provision controller configured to cause an output to output guidance information directed to a user of the first mobile body on the basis of the first mobile body movement information and the second mobile body movement history.

(2) In the aspect (1), the information provision controller curbs the output of the guidance information using the output until a movement time from the reference position is a predetermined time or more or a movement distance from the reference position is a predetermined distance or more.

(3) In the aspect (1), the information provision controller causes the output to output a predicted route, the predicted route being prediction information of a route from the first position of the first mobile body.

(4) In the aspect (3), the guidance device includes a third acquirer configured to acquire the predicted route, and the information provision controller causes the output to output each of the predicted route and the guidance information associated with the predicted route.

(5) In the above aspect (4), when the information provision controller causes the guidance information to be output, the information provision controller causes the predicted route acquired by the third acquirer corresponding to the guidance information to be output in a display aspect different from those of other routes.

(6) In the aspect (4), the guidance device further includes a fourth acquirer configured to acquire a first mobile body movement history including the first position in a movement history of the first mobile body, and the third acquirer acquires the predicted route on the basis of the first mobile body movement information, the second mobile body movement history, and the first mobile body movement history acquired by the fourth acquirer.

(7) In the aspect (6), the third acquirer acquires the predicted route on the basis of a similarity between the first mobile body movement information and the second mobile body movement history, and a similarity between the first mobile body movement information and the first mobile body movement history.

(8) In the aspect (6), the third acquirer acquires the predicted route by preferentially using the second mobile body movement history when a data amount or accuracy of the first mobile body movement history acquired by the fourth acquirer does not satisfy predetermined conditions.

(9) In the aspect (6), the information provision controller causes the output to output a first predicted route based on the first mobile body movement information and the second mobile body movement history, and a second predicted route based on the first mobile body movement information and the first mobile body movement history in different output aspects.

(10) In the aspect (6), the first mobile body movement information, the second mobile body movement history, and the first mobile body movement history each include at least one piece of information among the weather, a date and time, and a day of a week, and the third acquirer derives a similarity including the information, and acquires the predicted route on the basis of the derived similarity.

(11) In the aspect (3), the guidance information includes information on things associated with the predicted route.

(12) A guidance method according to an aspect of the present invention is a guidance method causing a computer to: acquire first mobile body movement information of a first mobile body from a reference position to a first position; acquire a second mobile body movement history including a movement history including the first position in a movement history of a second mobile body; and cause an output to output guidance information directed to a user of the first mobile body on the basis of the first mobile body movement information and the second mobile body movement history.

(13) A storage medium according to an aspect of the present invention is a computer-readable non-transitory storage medium storing a program, the program causing a computer to: acquire first mobile body movement information of a first mobile body from a reference position to a first position; acquire a second mobile body movement history including a movement history including the first position in a movement history of a second mobile body; and cause an output to output guidance information directed to a user of the first mobile body on the basis of the first mobile body movement information and the second mobile body movement history.

According to the above aspects (1) to (13), it is possible to provide more appropriate guidance information to a user.

BRIEF DESCRIPTION OF THE DRAWINGS

FIG. 3 is a diagram illustrating an example of content of guidance information.

FIG. 5 is a diagram illustrating an example of content of a vehicle movement history DB.

FIG. 10 is a diagram illustrating an example of content of a host vehicle movement history.

DESCRIPTION OF EMBODIMENTS

Hereinafter, embodiments of a guidance device, a guidance method, and a storage medium of the present invention will be described with reference to the drawings.

First Embodiment

System Configuration

Figure 1:
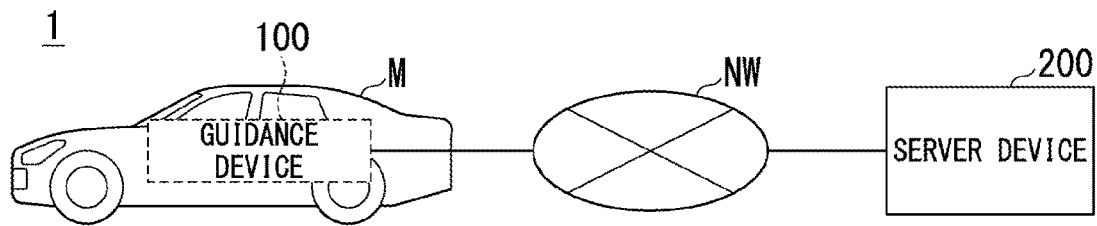
FIG. 1 is a diagram illustrating an example of a configuration of a guidance system to which a guidance device according to a first embodiment has been applied.

FIG. 1 is a diagram illustrating an example of a configuration of a guidance system 1 to which a guidance device according to a first embodiment has been applied. The guidance system 1 according to the first embodiment includes, for example, a guidance device 100 and a server device 200. In the illustrated example, the guidance device 100 is mounted in a host vehicle M.

The host vehicle M is an example of a "first mobile body." A vehicle other than the host vehicle M (hereinafter referred to as other vehicle) is an example of a "second mobile body." The host vehicle M is, for example, a vehicle such as a two-wheeled, three-wheeled, or four-wheeled vehicle. A driving source of these vehicle is an internal combustion engine such as a diesel engine or a gasoline engine, an electric motor, or a combination thereof. The electric motor is operated using power generated by a power generator connected to the internal combustion engine, or discharge power of a secondary battery or a fuel cell.

The guidance device 100 and the server device 200 are communicatively connected via a network NW. The network NW includes a local area network (LAN), a wide area network (WAN), or the like. The network NW may include, for example, a network using wireless communication such as Wi-Fi or Bluetooth (registered trademark; hereinafter omitted), or networks may be combined. The guidance system 1 may include a plurality of vehicles each including the guidance device 100 or may include a plurality of server devices.

The guidance device 100 provides guidance information on a thing associated with a route on which the host vehicle M is predicted to travel in the future to an occupant (an example of a user) of the host vehicle M. The things associated with the route include, for example, a thing around the route (within a predetermined distance from the route) or a thing present in a traveling direction of the route. The information on the thing includes, for example, point of interest (POI) information. The POI information is, for example, information on a target associated with a position (coordinate information) on a map. The target includes, for example, a natural feature on the earth such as a store, a facility, a building such as a bridge or a steel tower, or a topographic feature (a mountain, river, sea, pond, or lake). The POI information may include, for example, opening information, closing information, sale information, campaign information, and information on recommendations such as advertisements of a store. The POI information may include information on a road such as a road shape, the number of lanes, traffic rules, road changes (road expansion or blockade or traffic regulation changes), temporary road regulations due to construction, and the like. The guidance device 100 communicates with the server device 200 via the network NW and, for example, receives map data or guidance information acquired from the server device 200, movement histories of other vehicles, a predicted route of the host vehicle M, and the like or transmits information on the movement history of the host vehicle M or the like to the server device 200.

The server device 200 communicates with the guidance device 100 and transmits various types of information such as map data, guidance information, and a movement history of other vehicles to the guidance device 100. In this case, the server device 200 may receive a request signal from the guidance device 100 and transmit corresponding information to the guidance device 100, or may transmit various types of information to the guidance device 100 at a predetermined timing (for example, a map data updating timing or periodic timing).

Configuration of Guidance Device

Figure 2:
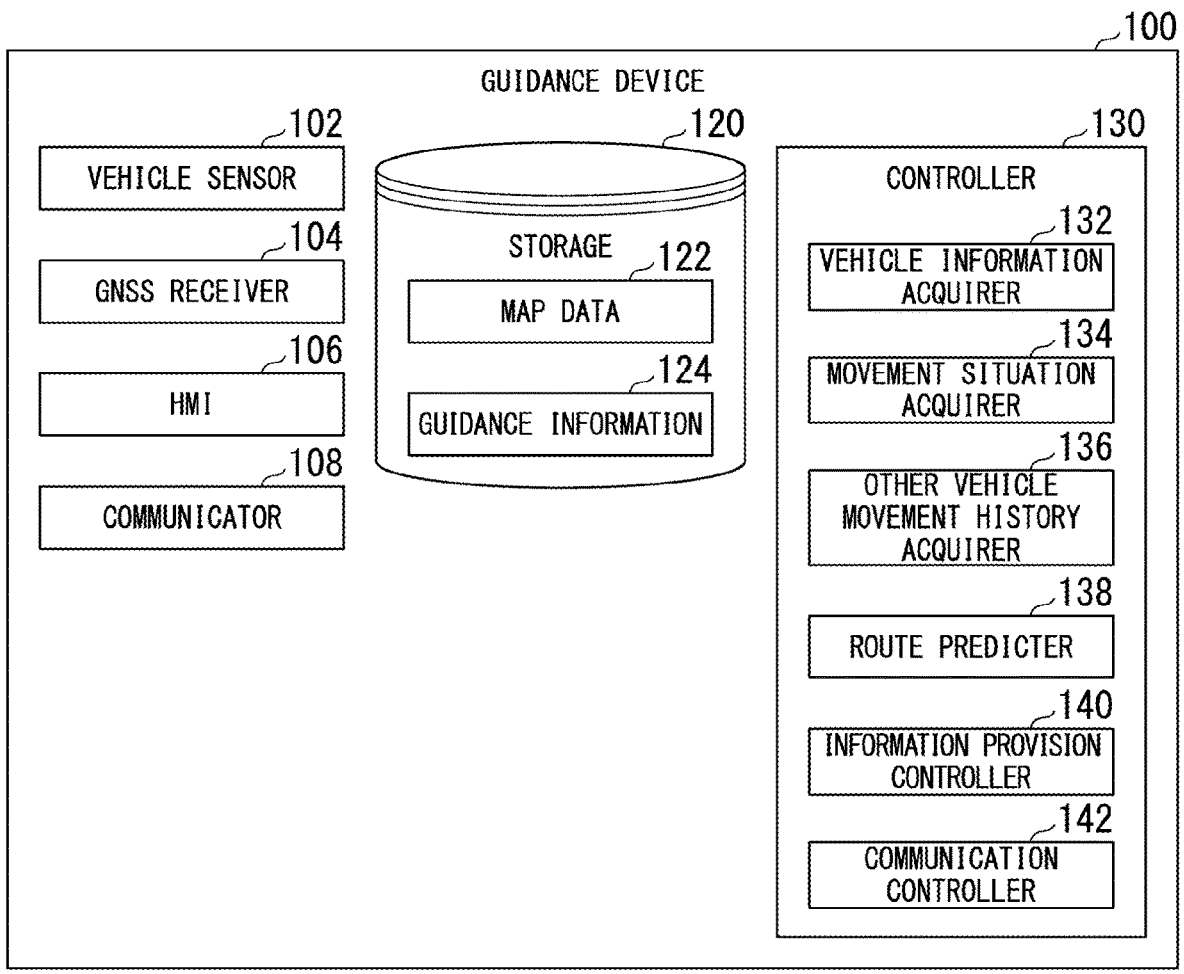
FIG. 2 is a diagram illustrating an example of the configuration of the guidance device according to the first embodiment.

FIG. 2 is a diagram illustrating an example of a configuration of the guidance device 100 according to the first embodiment. The guidance device 100 according to the first embodiment includes, for example, a vehicle sensor 102, a global navigation satellite system (GNSS) receiver 104, a human machine interface (HMI) 106, a communicator 108, a storage 120, and a controller 130. These devices or equipment are connected to each other by a multiplex communication line such as a controller area network (CAN) communication line, a serial communication line, a wireless communication network, or the like. The configuration of the guidance device 100 illustrated in FIG. 2 is merely an example, and a part of the configuration may be omitted, or another configuration may be added thereto. The HMI 106 is an example of an "output."

The vehicle sensor 102 detects, for example, an orientation sensor that detects a direction of the host vehicle M, a vehicle speed sensor that detects a speed of the host vehicle M, an acceleration sensor that detects an acceleration of the host vehicle M, a yaw rate sensor that detects an angular velocity around a vertical axis of the host vehicle M, and a torque sensor that detects a steering torque applied to a rotation shaft of a steering wheel. The vehicle sensor 102 may include a weather sensor that detects surrounding environment information such as a humidity or temperature around the host vehicle M and estimates the weather on the basis of the detected information. The vehicle sensor 102 outputs the detected information (hereinafter referred to as vehicle state data) to the controller 130.

The GNSS receiver 104 receives a signal (radio waves) from an artificial satellite such as a global positioning system (GPS), and specifies a position (for example, a latitude and longitude) of the host vehicle M on the basis of the received signal. The position of the host vehicle M may be specified or supplemented by an inertial navigation system (INS) using the vehicle state data output by the vehicle sensor 102. The GNSS receiver 104 outputs position data indicating the specified position of the host vehicle M to the controller 130.

The HMI 106 presents various types of information to the occupant of the host vehicle M and receives an input operation from the occupant. The HMI 106 includes, for example, a display device, a speaker, a microphone, a buzzer, a touch panel, switches, and keys. The display device includes, for example, a meter display provided in a part of an instrument panel facing a driver of the host vehicle M, a center display provided at a center of the instrument panel, and a head up display (HUD). The HUD is, for example, a device that causes an image superimposed on a landscape to be visually recognized. For example, the HUD projects light including an image onto a front windshield or a combiner of the host vehicle M, thereby allowing the occupant to visually recognize a virtual image.

The communicator 108 includes a communication interface such as an antenna or a network interface card (NIC). The communicator 108 communicates with the server device 200, another external device, or the like via the network NW under the control of a communication controller 142.

The storage 120 is realized by, for example, a hard disk drive (HDD), a flash memory, an electrically erasable programmable read only memory (EEPROM), a read only memory (ROM), or a random access memory (RAM). The storage 120 stores, for example, a program referred to by a processor of the guidance device 100, the map data 122, the guidance information 124, and other various types of information.

The map data 122 is, for example, data in which a road shape is expressed by a link indicating a road associated with position information, and nodes (connection portions of the link) connected by the link. Information on a curvature or lane of a road, and POI information may be included in the map data 122.

Information to be provided to the occupant, for example, is stored as POI information in the guidance information 124. FIG. 3 is a diagram illustrating an example of content of the guidance information 124. In the guidance information 124, for example, a link ID, a POI-ID, an information ID, provision period information, and guidance content are associated with the position information. The position information includes, for example, a latitude and a longitude. The link ID is, for example, identification information for identifying the link of the road described above. The POI-ID is, for example, identification information for identifying a target associated with position information. The information ID is, for example, identification information for identifying POI information associated with the POI-ID. The provision period information includes, for example, a start date and time and an end date and time. The start date and time includes, for example, a date and time when provision of the guidance information is started. The end date and time includes, for example, a date and time when the provision of the guidance information is ended. The guidance content includes, for example, information (specific POI information) provided to the occupant, which has been associated with the link ID, the POI-ID, and the information ID. Among the pieces of guidance information included in the guidance information 124, the guidance information of which the provision period has passed may be deleted at a predetermined timing.

The map data 122 and the guidance information 124 may be stored in an external storage device instead of the storage 120, for example. The guidance information 124 may be included in the map data 122.

Referring back to FIG. 2, the controller 130 includes, for example, a vehicle information acquirer 132, a movement situation acquirer 134, an other vehicle movement history acquirer 136, a route predicter 138, an information provision controller 140, and the communication controller 142. These components are realized, for example, by a processor such as a central processing unit (CPU) or a graphics processing unit (GPU) executing a program (software). Some or all of these components may be realized by hardware (including circuitry) such as a large scale integration (LSI), an application specific integrated circuit (ASIC), or a field-programmable gate array (FPGA) or may be realized by software and hardware in cooperation. The program may be stored in the storage (a storage device including a non-transitory storage medium) 120 such as an HDD or a flash memory of the guidance device 100 in advance or may be stored in a detachable storage medium (a non-transitory storage medium) such as a DVD or a CD-ROM and installed in the HDD or the flash memory of the guidance device 100 by the storage medium being mounted in a drive device. The movement situation acquirer 134 is an example of a "first acquirer." The other vehicle movement history acquirer 136 is an example of a "second acquirer." The route predicter 138 is an example of a "third acquirer."

The vehicle information acquirer 132 acquires, for example, input data such as operation content or sound from the occupant, which has been received by the HMI 106. The vehicle information acquirer 132 acquires, for example, the vehicle state data from the vehicle sensor 102. The vehicle information acquirer 132 acquires the position data of the host vehicle M from the GNSS receiver 104.

The movement situation acquirer 134 acquires host vehicle movement information (an example of first mobile body movement information) including a movement situation of the host vehicle M from the reference position to the first position. The reference position is, for example, a departure point when the host vehicle M has started traveling. The reference position may be a point at which prediction of a future travel route of the host vehicle M has started under a predetermined condition. The predetermined condition is, for example, that instruction information for instructing the start of prediction of a travel route or the start of provision of guidance information has been received by the HMI 106, or that the host vehicle M has reached a point at which the prediction of a preset travel route starts or a point at which the provision of the information starts. The first position is, for example, a current position of the host vehicle M included in the vehicle state data. In the following description, a departure point is used as an example of the reference position and the current position of the host vehicle M is used as an example of the first position.

For example, in a case in which a driving source of the host vehicle M has been switched from a stopped state (engine OFF state) to a startup state (engine ON state) and a time from a time when a immediately previous startup state has ended (a stop state start time) has elapsed at least a predetermined time (for example, about 60 minutes and, more preferably, 10 minutes or less), the movement situation acquirer 134 acquires position information (for example, a latitude and a longitude) of the host vehicle M at that point in time as the departure point. In a case in which the driving source of the host vehicle M has been switched from the startup state to the stopped state and the driving source does not enter the startup state even when a predetermined time (for example, about 30 minutes) or more elapses, the movement situation acquirer 134 may acquire the position information (for example, the latitude and the longitude) of the host vehicle M as an arrival point. By acquiring the departure point or the arrival point under the conditions described above, it is possible to acquire, for example, a series of travel routes (for example, a route from home to a shopping mall) without including a point at which the host vehicle M has temporarily stopped by a store such as a convenience store as the departure point or the arrival point.

The movement situation acquirer 134 acquires the current position of the host vehicle M every predetermined time. The movement situation acquirer 134 acquires link IDs of roads associated with the current position by referring to the map data 122 on the basis of the acquired current position. Therefore, the number of acquired link IDs increases when a travel time or a travel distance of the host vehicle M increases.

The movement situation acquirer 134 may acquire a date and time, a day of the week, weather information, and the like as a situation at the time of traveling. The date and time is, for example, a date and time when the position of the host vehicle M has been acquired. The date and time may be a period of time. The day of the week is, for example, a day of the week when the position of the host vehicle M has been acquired. The weather is, for example, weather when the position of the host vehicle M has been acquired. Information on the date and time and the day of the week is acquired by a date and time manager (not illustrated) mounted in the host vehicle M. The movement situation acquirer 134 may acquire the weather information regarding a traveling position from a weather server, for example, by communicating with the weather server via the network NW or may acquire the weather information from the vehicle sensor 102.

The other vehicle movement history acquirer 136 requests the server device 200 to acquire a movement history of the other vehicle, and acquires an other vehicle movement history (an example of the second mobile body movement history) from the server device 200. In this case, the other vehicle movement history acquirer 136 transmits information on the current position of the host vehicle M acquired by the movement situation acquirer 134 to the server device 200, and acquires the other vehicle movement history including the current position of the host vehicle M among the movement history of the other vehicle. The other vehicle movement history acquirer 136 may transmit, to the server device 200, information on the departure point of the host vehicle M instead of (or in addition to) the current position of the host vehicle M, and acquire other vehicle movement history including the departure point.

The route predictor 138 acquires a predicted route (hereinafter referred to as a first predicted route) that is prediction information of a route from the current position of the host vehicle M on the basis of the host vehicle movement information acquired by the movement situation acquirer 134 and the other vehicle movement history acquired by the other vehicle movement history acquirer 136. The predicted route is, for example, a route on which the host vehicle M is predicted to travel in the near future. Details of a function of the route predictor 138 will be described below.

The information provision controller 140 causes the HMI 106 to output the guidance information directed to an occupant (an example of the user) of the host vehicle M on the basis of the host vehicle movement information acquired by the movement situation acquirer 134 and the other vehicle movement history acquired by the other vehicle movement history acquirer 136. For example, the information provision controller 140 acquires, for example, map data of the vicinity of the current position of the host vehicle M from the map data 122 and causes the acquired map data to be displayed on the display device of the HMI 106 or causes the first predicted route predicted by the route predictor 138 or the guidance information associated with the first predicted route to be displayed on the displayed map. The information provision controller 140 may cause the speaker of the HMI 106 to output the first predicted route or the guidance information associated with the first predicted route, instead of (or in addition to) causing the first predicted route or the guidance information to be displayed on the display device. Details of a function of the information provision controller 140 will be described below.

The communication controller 142 controls transmission and reception of data to and from the server device 200 or the external device through the communicator 108. The communication controller 142, for example, causes a request for acquisition of the map data 122, the guidance information 124, and the other vehicle movement history from the server device 200 to be transmitted to the server device 200. The communication controller 142 causes the communicator 108 to transmit information in which the host vehicle movement information is associated with a vehicle ID of the host vehicle M to the server device 200. The communication controller 142 may transmit the vehicle state data, the host vehicle movement information, or the like from the communicator 108 to the server device 200 or an external device.

The communication controller 142 performs control of transmission and reception using the communicator 108. For example, the communication controller 142 stores the map data 122 or the guidance information 124 transmitted from the server device 200, which has been received by the communicator 108, in the storage, or outputs the other vehicle movement history received by the communicator 108 to the other vehicle movement history acquirer 136.

Configuration of Server Device

Figure 4:
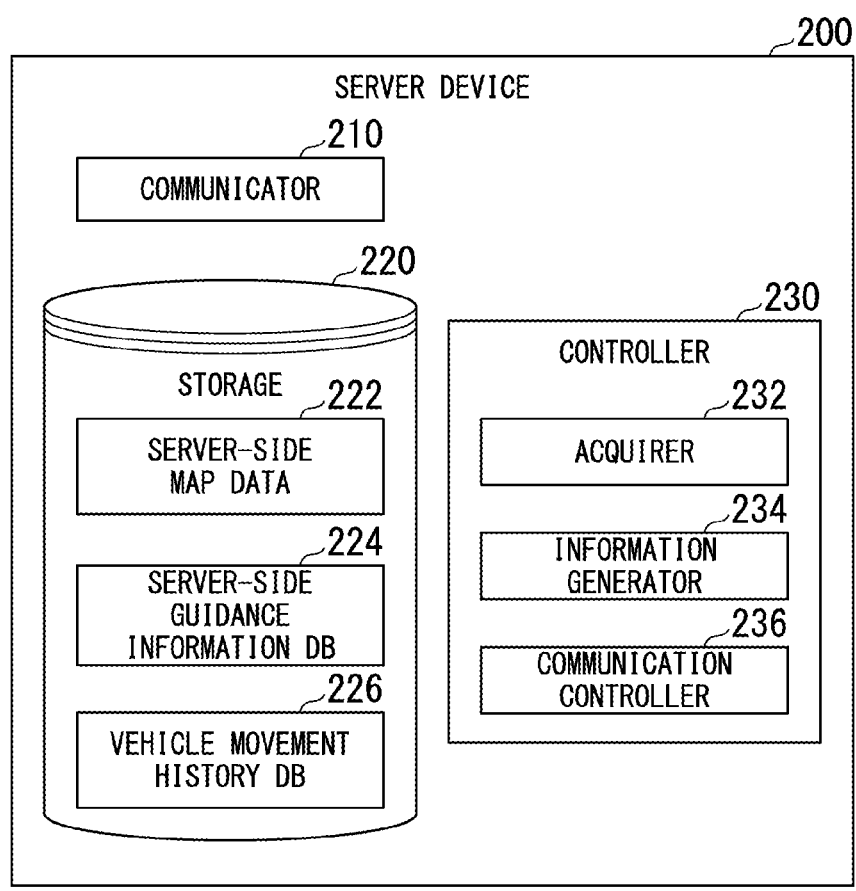
FIG. 4 is a diagram illustrating an example of a configuration of a server device according to the first embodiment.

FIG. 4 is a diagram illustrating an example of a configuration of the server device 200 according to the first embodiment. The server device 200 includes, for example, a communicator 210, a storage 220, and a controller 230. The configuration of the server device 200 illustrated in FIG. 4 is merely an example, and may be partially omitted or another configuration may be added. Further, the server device 200 may be configured as a separate body for each of a plurality of functions, and the respective separate bodies may collectively function as the server device 200.

The communicator 210 includes, for example, a communication interface such as an antenna or a NIC. The communicator 210 communicates with the guidance device 100, an external device, or the like via the network NW under the control of the communication controller 236.

The storage 220 is realized by, for example, an HDD, a flash memory, an EEPROM, a ROM, or a RAM. Programs that are referred to by a processor, server-side map data 222, a server-side guidance information DB 224, a vehicle movement history DB 226, and other various types of information, for example, are stored in the storage 220. The server-side map data 222 or the server-side guidance information DB 224 store the same items as the map data 122 or the guidance information 124. It is assumed that the server-side map data 222 stores the latest and a wide range of map data. It is assumed that the latest guidance information associated with the map data of the server-side map data 222 is stored in the server-side guidance information DB 224. The server-side guidance information DB 224 may be included in the server-side map data 222.

FIG. 5 is a diagram illustrating an example of content of the vehicle movement history DB 226. In the vehicle movement history DB 226, for example, a route ID, a date and time, a day of the week, the weather, position information, and a link ID are associated with the vehicle ID. The vehicle ID is identification information for identifying the vehicle. In the vehicle movement history DB 226, movement histories (vehicle movement information) transmitted from the host vehicle M and one or more other vehicles are stored in association with vehicle IDs that are identification information for identifying the vehicles.

The controller 230 includes, for example, an acquirer 232, an information generator 234, and a communication controller 236. These components are realized, for example, by a processor such as a CPU or GPU executing a program (software). Some or all of these components may be realized by hardware (including circuitry) such as an LSI, an ASIC, or an FPGA or may be realized by software and hardware in cooperation. The program may be stored in a storage device (a storage device including a non-transitory storage medium) such as an HDD or a flash memory of the server device 200 in advance or may be stored in a detachable storage medium (a non-transitory storage medium) such as a DVD or a CD-ROM and installed in the HDD or the flash memory of the server device 200 by the storage medium being mounted in a drive device.

The acquirer 232 acquires the current position of the host vehicle M from the guidance device 100 via the communicator 210 and also acquires the request for acquisition of the other vehicle movement history. The acquirer 232 may acquire map data and guidance information from an external device connected via the network NW, store the acquired map data in the server-side map data 222, and store the guidance information in the server-side guidance information DB 224. The acquirer 232 may acquire the host vehicle movement information and the vehicle ID of the host vehicle M obtained from the guidance device 100, and store the host vehicle movement information in the vehicle movement history DB 226 in association with the acquired vehicle ID. The acquirer 232 may store movement information of the other vehicle in the vehicle movement history DB 226 in association with a vehicle ID of the other vehicle.

On the basis of the acquisition request acquired by the acquirer 232, the information generator 234 collates the current position of the host vehicle M with position information of the vehicle movement history DB 226 and extracts the current position of the host vehicle M and the movement history of other vehicles that have traveled around the current position. "Around" the current position may be, for example, a range corresponding to the same link ID as a link ID associated with the current position or a link ID adjacent to the link ID, or may a range within a predetermined distance around the current position. The information generator 234 generates the extracted movement history of the other vehicles as the other vehicle movement history, and causes the communication controller 236 to transmit the generated other vehicle movement history to the vehicle that has made the acquisition request.

The communication controller 236 controls transmission and reception of data using the communicator 210. For example, the communication controller 236 receives a request for the other vehicle movement history, the host vehicle movement information, and the like from the guidance device 100 via the communicator 210. The communication controller 236 causes the communicator 210 to transmit the map data, the guidance information obtained from the guidance information DB 224, and the other vehicle movement history generated by the information generator 234 to the guidance device 100.

Route Predicter and Information Provision Controller

Next, details of functions of the route predicter 138 and the information provision controller 140 will be described. Hereinafter, a process of each configuration in a scene in which a destination, a specific travel route, or the like of the host vehicle M is not set by a navigation device or the like in advance will be described.

Figure 6:
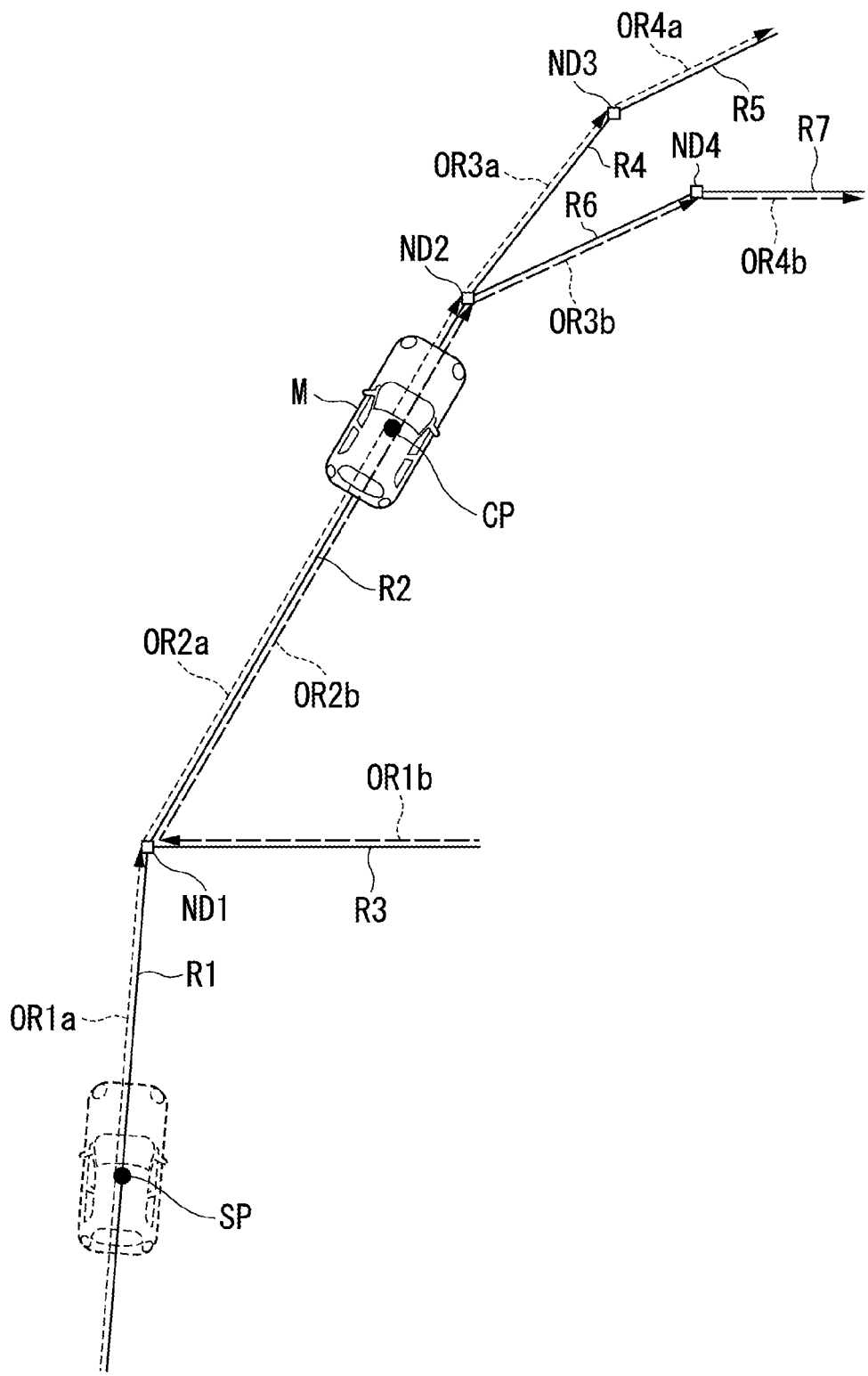
FIG. 6 is a diagram illustrating a process of a route predicter.

FIG. 6 is a diagram illustrating a process of the route predicter 138. In the example of FIG. 6, it is assumed that R1 to R7 indicate link IDs of respective roads, and ND1 to ND4 indicate nodes to which links are connected. It is assumed that the other vehicle movement history includes movement information of other vehicles m1 and m2, and in the example of FIG. 6, routes OR1a to OR4a are travel routes of the other vehicle m1 included in the other vehicle movement history, and routes OR1b to OR4b are travel routes of the other vehicle m2 included in the other vehicle movement history.

Since a destination or a route has not been set in the host vehicle M in advance, it is not possible to specify which link from R4, R6, R1, and R3 on which the host vehicle M will travel next in the example of FIG. 6. Therefore, appropriate guidance information cannot be determined. This is because the guidance information is preferably relevant to a node on which the host vehicle M travels, or a node and a link on which the host vehicle M is scheduled to travel. When the host vehicle M is scheduled to travel on R4 as in the example of FIG. 6, there is concern that providing the guidance information regarding R6, ND4, and R7 to the host vehicle M on R2 may be troublesome for the occupant. For example, when a route to a destination is not set in the host vehicle M by a navigation device or the like, the route predicter 138 predicts the first predicted route on the basis of movement information of the host vehicle M from the departure point SP to the current position CP acquired by the movement situation acquirer 134 and the other vehicle movement history acquired by the other vehicle movement history acquirer 136. Thereby, it is possible to acquire more appropriate guidance information and notify the occupant of the host vehicle M of the guidance information via the HMI 106.

For example, the route predictor 138 derives a similarity between the routes on the basis of a degree of matching between link IDs from the departure point SP to the current position CP acquired from the movement information of the host vehicle M and link IDs on the route included in the other vehicle movement history. For example, in the example of FIG. 6, the link IDs from the departure point SP to the current position CP of the host vehicle M are "R1" and "R2," link IDs of the travel routes OR1a to OR4a of the other vehicle m1 are "R1," "R2," "R3," and "R4," and link IDs of the travel routes OR1b to OR4b of the other vehicle m2 are "R3," "R2," "R6," and "R7." The route predictor 138 collates the link ID of the host vehicle M with the link IDs of the other vehicles m1 and m2, and acquires the route of the other vehicle m1 having a high degree of matching of the link ID as a route having a high similarity to the host vehicle movement information. The route predictor 138 predicts a link ID of the first predicted route ahead of the current position of the host vehicle M (more specifically, ahead of the node ND2) on the basis of the route of the other vehicle m1 having a high similarity, as "R4" and "R5."

The route predictor 138 may acquire routes of which the similarity is equal to or greater than a threshold value, or may acquire a predetermined number of routes in a descending order of the similarity. The threshold value or the predetermined number may vary according to, for example, a road situation, a day of the week, a date and time, or the weather when the host vehicle M is traveling. The route predictor 138 may cause the predicted route and the corresponding guidance information to be displayed in association with each other.

In addition to the collation of the link IDs described above, the route predictor 138 may perform collation using at least one of the weather, the date and time, or the day of the week included in the host vehicle movement information and the other vehicle movement history, and extract the other vehicle movement history with a high similarity on the basis of a result of the collation. For example, when the host vehicle M is traveling on a Saturday morning in rainy weather, the route predictor 138 increases a weight of a similarity of a previous movement history of other vehicles that have passed through the current position CP on a Saturday morning in the same weather. Thereby, it is possible to easily acquire other vehicle movement history close to a traveling situation of the host vehicle M on the basis of a congestion situation of a road, the presence or absence of a facility event, and the like.

The route predictor 138 may increase a weight of a priority of a route of which a departure point is a point within a predetermined distance from the departure point SP of the host vehicle M in the other vehicle movement history. Thereby, when the host vehicle M has a parking lot at home as a departure point, it is possible to easily acquire a movement history of other vehicles near the home. The point within the predetermined distance from the departure point SP of the host vehicle M may be a mesh in which a departure point of the other vehicle is the same as the departure point SP or may be a point located near in a Neumann mesh. The mesh, for example, is preferably 500 m square or less and, more preferably 125 m square or less. As a result, it is possible to improve a prediction accuracy of the first prediction route.

When vehicle type information is included in the other vehicle movement history, the route predictor 138 may increase a weight of a priority of a route in the same vehicle type information as the vehicle type information of the host vehicle M. When occupant information is included in the other vehicle movement history, the route predictor 138 may increase a weight of a priority of a route in the occupant information having a high similarity to the occupant information of the host vehicle M. The occupant information includes, for example, preference information such as a sex, age, or hobbies in driver information, and affiliation information such as a workplace. The occupant information may include information (number of people, age, or the like) on occupants other than a driver. Thereby, it is possible to easily acquire a movement history of other vehicles of similar vehicle types or occupant configurations.

The route predictor 138 may derive other vehicle movement history having a high similarity using a travel trajectory from the departure point SP to the current position CP, in addition to calculating the similarity based on the link IDs described above, and acquire the first predicted route on the basis of the derived route. The route predictor 138, for example, may generate an area (mesh) including a predetermined number of trajectory points (plot points) in the traveling trajectory from the departure point SP to the current position CP, derive the other vehicle movement history having a high similarity on the basis of the generated area, and acquire the first predicted route on the basis of the derived route.

The information provision controller 140 acquires guidance information associated with the first predicted route (for example, the link IDs "R4" and "R5" illustrated in FIG. 6) in the guidance information 124 stored in the storage 120, which is the guidance information in which a current date and time is within the provision period (between the start date and the end date), and causes the HMI 106 to output the acquired guidance information.

Figure 7:
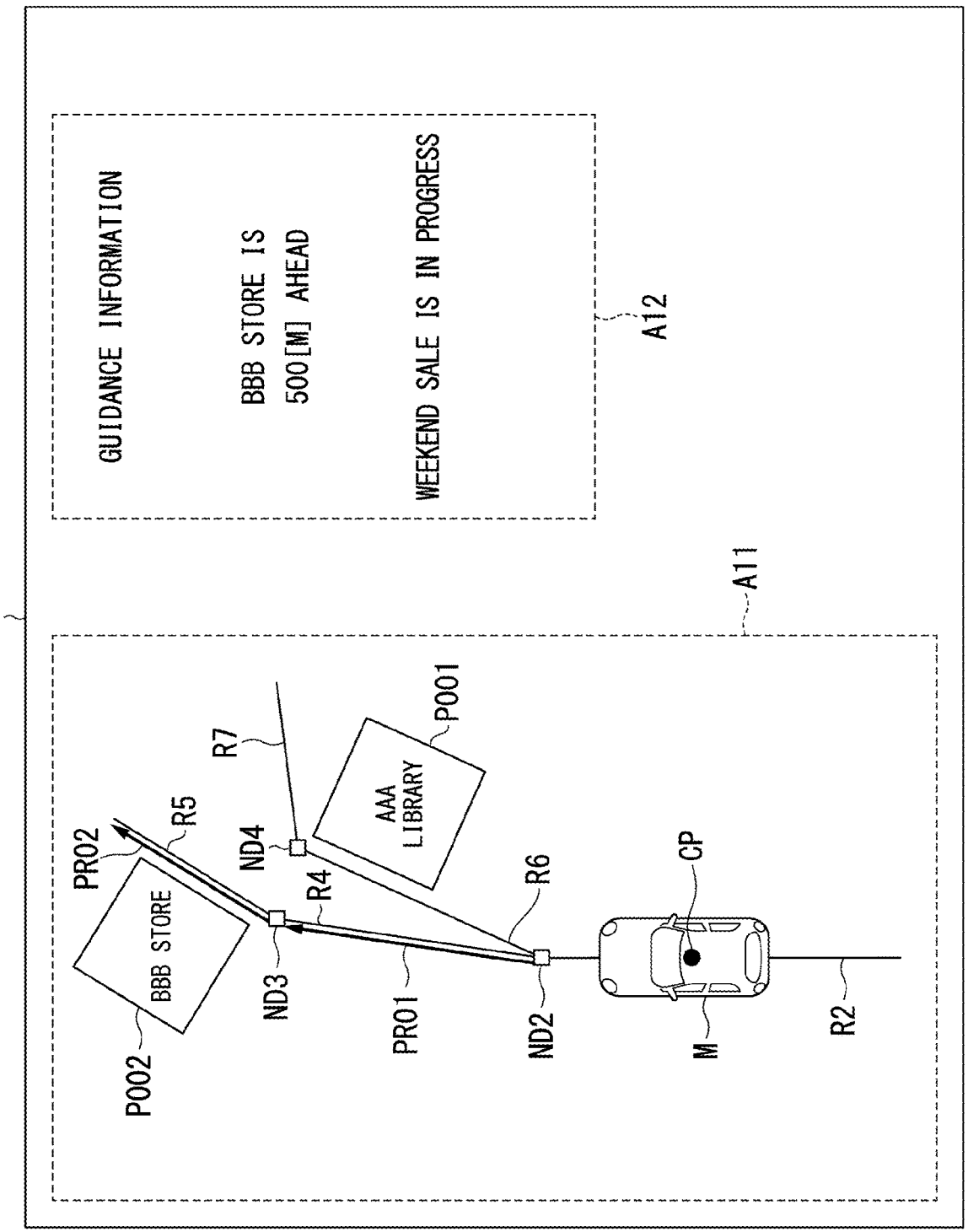
FIG. 7 is a diagram illustrating an example of an image that is displayed on a display device of an HMI of the first embodiment.

FIG. 7 is a diagram illustrating an example of an image IM1 that is displayed on the display device of the HMI 106 according to the first embodiment. The image IM1 includes, for example, a map display area A11 and a guidance information display area A12. The map display area A11 and the guidance information display area A12 may partially overlap, may be displayed on the same display device, or may be displayed on different display devices. An image imitating the host vehicle M, images imitating a road (the link ID "R2") in which the host vehicle M is traveling and roads (the link IDs "R4" to "R7") present in the vicinity in a traveling direction, and an image imitating POI information (P001 and P002) present in the vicinity in the traveling direction, for example, are included in the map display area A11.

The information provision controller 140 may cause the above-described image to be displayed, and cause images PR01 and PR02 imitating the first predicted route predicted by the route predictor 138 to be displayed at positions associated with the images imitating the roads with the link IDs "R4" and "R5" of the map display area A11. In the example of FIG. 7, the images PR01 and PR02 are displayed at positions along the roads with the link IDs "R4" and "R5."

In the guidance information display area A12, for example, the guidance information associated with the first predicted route is displayed. The information provision controller 140 performs collation with the link ID of the guidance information 124 stored in the storage on the basis of the link IDs "R4" and "R5", and displays guidance content associated with the matching link ID. In the example of FIG. 7, the guidance information is displayed in the guidance information display area A12. When the guidance information is displayed in the guidance information display area A12, the information provision controller 140 may cause P001 and PR02 in the map display area A11 to be displayed or cause R4 and R5 to be highlighted in contrast to other roads. Thereby, it is possible to provide the occupant with the first predicted route and the guidance information associated with the first predicted route even when the occupant of the host vehicle M does not set the destination.

The information provision controller 140 may derive a distance from the current position CP of the host vehicle M to each point of the POI information (P001 and P002) on the basis of the map data 122, and cause the guidance information including the derived distance to be displayed. In the example of FIG. 7, an image of text information "BBB store is 500 [m] ahead" and "Weekend sale is in progress" is displayed as the guidance information in the guidance information display area A12. Thereby, it is possible to allow the occupant to more accurately ascertain which store or facility the guidance information is for.

When a distance from the departure point SP to the current position CP is short, a large number of routes having a high similarity are extracted, and the guidance information is likely not to be narrowed down. Therefore, the information provision controller 140 curbs output of images imitating the predicted routes for traveling or the guidance information to the HMI 106 until a movement time of the host vehicle M from the departure point SP becomes a predetermined time or more or until a movement distance from the departure point SP becomes a predetermined distance or more. Thereby, it is possible to curb providing a large amount of guidance information immediately after departure or displaying guidance information not desired by the occupant.

The information provision controller 140 may cause a part or all of information obtained from the displayed image IM1 to be output as sound from the speaker of the HMI 106, instead of (or in addition to) the displayed content described above.

The information provision controller 140 updates the first predicted route and the guidance information associated with the first predicted route at a predetermined timing. The predetermined timing is, for example, when an amount of change in the first predicted route before and after the updating is equal to or greater than a threshold value, when the content of the guidance information changes, when a predetermined time has elapsed since the guidance information has been displayed, or when a predetermined number or more of predicted routes have been changed in a state in which a plurality of predicted routes are displayed. Thereby, it is possible to curb frequent updating of the guidance information and it is possible to easily allow the occupant to ascertain the guidance information.

Processing Flow

Figure 8:
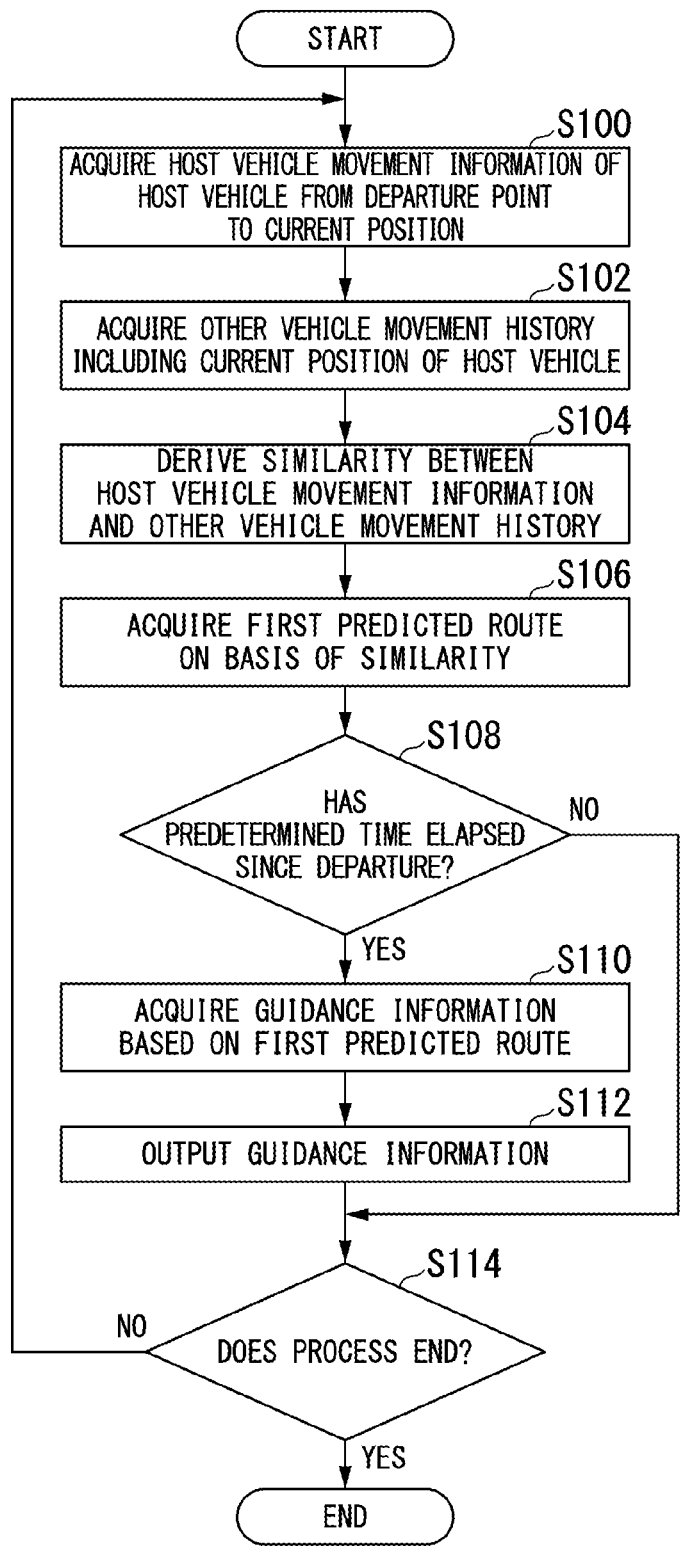
FIG. 8 is a flowchart illustrating a flow of a process that is executed by the guidance device according to the first embodiment.

FIG. 8 is a flowchart illustrating a flow of a process that is executed by the guidance device 100 according to the first embodiment. First, the movement situation acquirer 134 acquires the host vehicle movement information of the host vehicle M from the departure point to the current position (step S100). Then, the other vehicle movement history acquirer 136 acquires the other vehicle movement history including the current position of the host vehicle M (step S102). Then, the route predictor 138 derives a similarity between the host vehicle movement information and the other vehicle movement history (step S104). Then, the route predictor 138 acquires the first predicted route on the basis of the similarity (step S106).

Then, the information provision controller 140 determines whether or not a predetermined time has elapsed since the host vehicle M has departed from the departure point SP (step S108). In step S108, the information provision controller 140 may determine whether or not a distance from the departure point SP is equal to or greater than a predetermined distance instead of (or in addition to) the time since the departure from the departure point SP. When the information provision controller 140 has determined that the predetermined time has elapsed since the departure, the information provision controller 140 acquires guidance information based on the first predicted route (step S110) and causes the HMI 106 to output the acquired guidance information (step S112).

After the process of step S112 or in the process of step S108, when the information provision controller 140 has determined that the predetermined time has not elapsed since departure, the controller 130 determines whether or not to end a guidance information providing process (step S114). When the controller 130 has determined not to end the process, the process returns to step S100. Further, when an end instruction from the occupant is received from the HMI 106 or when the host vehicle M has stopped, the controller 130 determines to end the providing process, and ends the process of this flowchart.

According to the first embodiment described above, the movement situation acquirer 134 that acquires the first mobile body movement information that is the movement history of the host vehicle M from the departure point to the current position, the other vehicle movement history acquirer 136 that acquires the second mobile body movement information that is the movement history including the current position in the current movement history of other vehicles, and the information provision controller 140 that causes the HMI 106 to output the guidance information directed to the occupant of the host vehicle M on the basis of the first mobile body movement information and the second mobile body movement information are included. Thereby, it is possible to provide more appropriate guidance information to the user. According to the first embodiment, it is possible to provide the predicted route or the guidance information associated with the predicted route even when the destination is not set by the navigation device or the like.

Second Embodiment

Next, a second embodiment will be described. A guidance system of the second embodiment is different from the guidance system 1 of the first embodiment in that the guidance device 100 acquires a previous movement history of the host vehicle M (hereinafter referred to as the host vehicle movement history), in addition to the other vehicle movement history, and acquires a predicted route on the basis of the acquired host vehicle movement history and host vehicle movement information. Hereinafter, differences described above will be described. In the following description, the same configurations as that in the first embodiment are denoted by the same names and reference numerals and a specific description thereof will be omitted.

Figure 9:
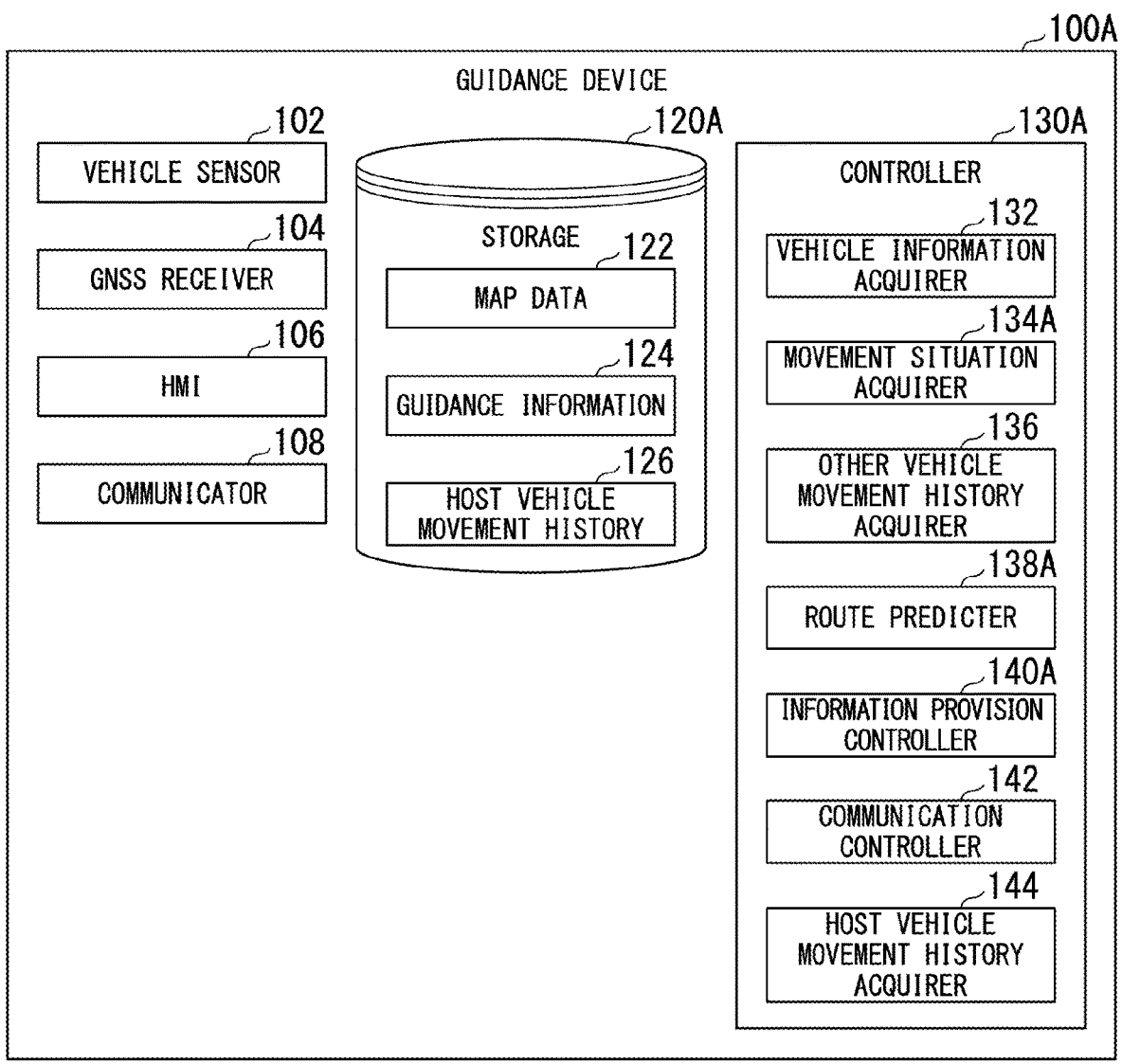
FIG. 9 is a diagram illustrating an example of a configuration of a guidance device according to a second embodiment.

FIG. 9 is a diagram illustrating an example of a configuration of a guidance device 100A according to the second embodiment. The guidance device 100A is different from the guidance device 100 of the first embodiment in that a host vehicle movement history 126 is stored in a storage 120A, and a controller 130A includes a movement situation acquirer 134A, a route predictor 138A, an information provision controller 140A, and a host vehicle movement history acquirer 144. Therefore, the following description will focus on the host vehicle movement history 126, the movement situation acquirer 134A, the route predictor 138A, the information provision controller 140A, and the host vehicle movement history acquirer 144. The host vehicle movement history 126 is an example of a "first mobile body movement history." The host vehicle movement history acquirer 144 is an example of a "fourth acquirer."

The movement situation acquirer 134A acquires the host vehicle movement information and stores a series of pieces of host vehicle movement information from the departure to the arrival in the host vehicle movement history 126 at a point in time when the arrival point of the host vehicle M has been settled. FIG. 10 is a diagram illustrating an example of content of the host vehicle movement history 126. In the host vehicle movement history 126, for example, a date and time, a day of the week, the weather, position information (latitude and longitude), and a link ID are associated with the route ID. The route ID is identification information for identifying a route on which the host vehicle M has traveled, and more specifically, is host vehicle movement information from the departure point SP to the arrival point. The date and time, day of the week, weather, position information, and link ID include information that is the same as the items of the host vehicle movement information described above. The movement situation acquirer 134A may transmit the host vehicle movement history 126 to the server device 200 at a predetermined timing. The movement situation acquirer 134A may delete the host vehicle movement information for which a predetermined period has elapsed or the host vehicle movement information transmitted to the server device 200 in the host vehicle movement history 126.

The route predictor 138A derives a predicted route (hereinafter referred to as a second predicted route) based on the host vehicle movement information and the host vehicle movement history 126 that is a previous movement history of the host vehicle M, in addition to the first predicted route. Specifically, the route predictor 138A acquires a movement history including the current position CP of the host vehicle movement information in the host vehicle movement history 126, and derives a similarity between a movement route included in the acquired movement history and a movement route from the departure point SP to the current position CP. The route predictor 138A acquires the second predicted route on the basis of the derived similarity. The route predictor 138A may compare a similarity between the first predicted route and the second predicted route, and acquire the predicted route with the higher similarity as a final predicted route.

The route predictor 138A may acquire the predicted route by preferentially using the other vehicle movement history in a case in which a data amount or accuracy of the host vehicle movement history 126 acquired by the host vehicle movement history acquirer 144 does not satisfy predetermined conditions. The case in which the data amount does not satisfy the predetermined conditions is, for example, a case in which the data amount is less than a predetermined amount. The case in which the accuracy does not satisfy the predetermined conditions is, for example, a case in which a degree of matching between the predicted route and an actual travel route (a movement history) is equal to or less than a threshold value in the data included in the host vehicle movement history 126. The degree of matching may be calculated by, for example, the route predictor 138A. "Preferentially using other vehicle movement history" includes, for example, using the other vehicle movement history instead of the host vehicle movement history 126, or including a part or all of the other vehicle movement history in a part or all of the host vehicle movement history 126. Thereby, when a data amount of the host vehicle movement history is small (for example, the host vehicle has not traveled much near the current position CP) or when the accuracy of the host vehicle movement history is low, it is possible to improve the accuracy of the predicted route by preferentially using other vehicle movement history assumed to have a large data amount and high accuracy.

The information provision controller 140A acquires the final predicted route predicted by the route predictor 138A or the guidance information associated with the predicted route, and outputs the final predicted route or the guidance information to the HMI 106. The information provision controller 140A may cause the HMI 106 to output the first predicted route, the second predicted route, and the guidance information associated with each predicted route in different output aspects. The different output aspects indicate, for example, that information on the first predicted route (for example, the route and the guidance information) and information on the second predicted route (the route and the guidance information) are identifiably output. For example, when the output aspect is a display aspect, the information provision controller 140A changes, for example, a color or a pattern of an image to be displayed, a character font, the presence or absence of an underline, the presence or absence of blinking, or a timing When the output aspect is a voice output aspect, the information provision controller 140A changes a speaker, a sex of a voice, a dialect, an accent, a tone, or the like. Thereby, it is possible to allow the occupant to identifiably ascertain information on different routes.

Figure 11:
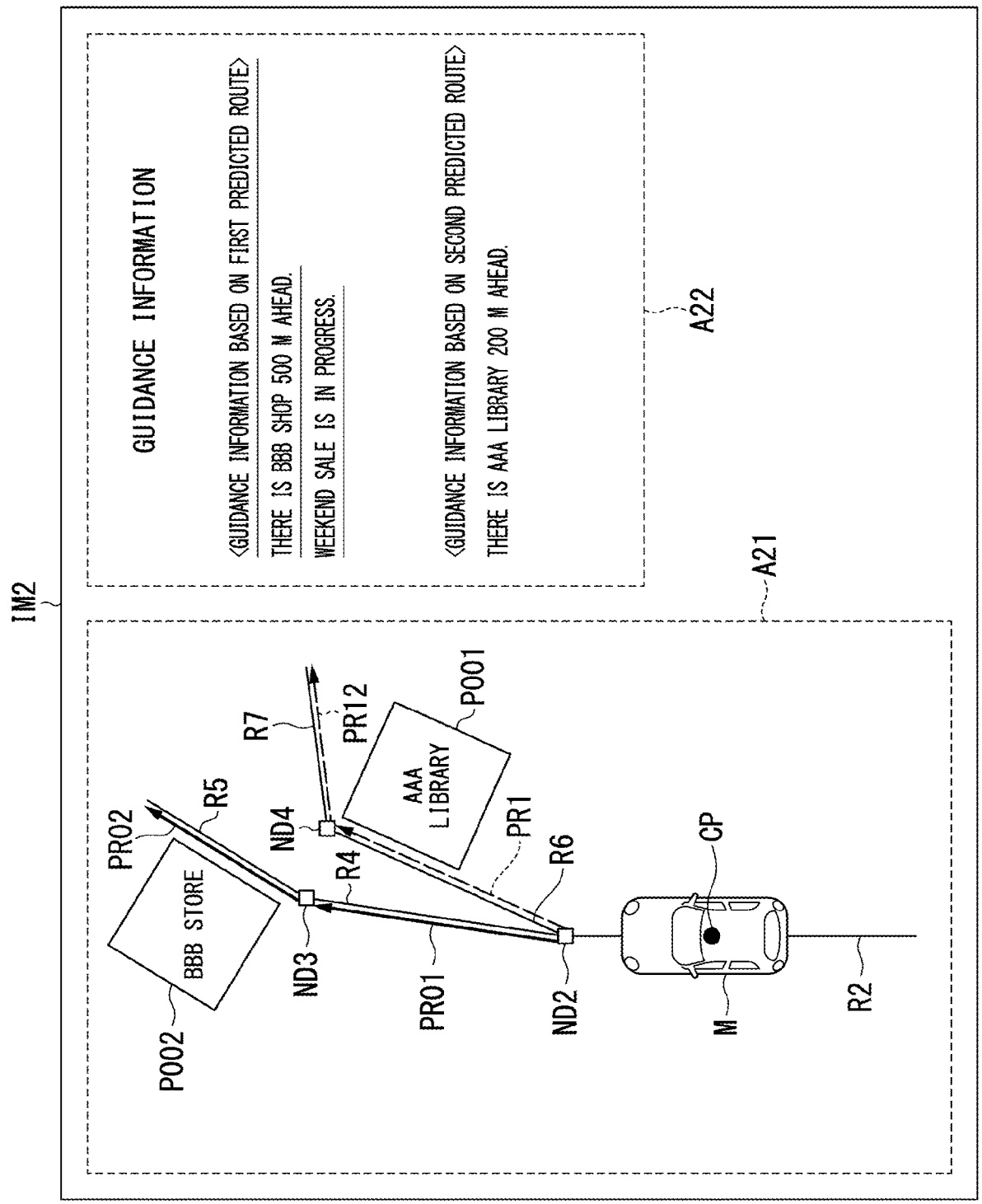
FIG. 11 is a diagram illustrating an example of an image that is displayed on a display device of an HMI according to the second embodiment.

FIG. 11 is a diagram illustrating an example of an image IM2 that is displayed on the display device of the HMI 106 according to the second embodiment. The image IM2 is an image is displayed in the same scene as a scene in which the image IM1 illustrated in FIG. 7 is displayed. The image IM2 includes, for example, a map display area A21 and a guidance information display area A22. The map display area A21 and the guidance information display area A22 may be displayed on the same display device or may be displayed on different display devices. The map display area A21 includes images PR11 and PR12 imitating the second predicted route, in addition to the image displayed in the map display area A11 of the first embodiment. In the guidance information display area A22, guidance information based on the first predicted route and guidance information based on the second predicted route are identifiably displayed by the presence or absence of a headline or an underline. For example, when the information provision controller 140A causes the guidance information to be displayed in the guidance information display area A22, the information provision controller 140A may cause images of roads in the map display area A21 corresponding to the guidance information, that is, P001, PR02, PR11, and PR12 to be displayed, and may cause respective images of R4, R5, and ND3 or respective images of R6, R7, and ND4 to be highlighted in contrast to other roads or intersections. Thereby, the occupant can ascertain both the predicted route based on the other vehicle movement history and the route based on the host vehicle movement history.

The information provision controller 140A may make the display aspect of the predicted route different from other routes on the basis of a relationship among the host vehicle movement information, the other vehicle movement history, and the host vehicle movement history. In this case, the route predictor 138A compares a similarity between the host vehicle movement information and the other vehicle movement history with a similarity between the host vehicle movement information and the host vehicle movement history, and acquires a predicted route having a high similarity. The information provision controller 140A may highlight information on the predicted route having a high similarity acquired by the route predictor 138A in contrast to information on the other predicted routes. "Highlight" includes, for example, allowing a color or a pattern of an image of the predicted route to be more easily visually recognized than those of other predicted routes or causing the image to blink. "Highlight" is to make an image imitating a facility or the like associated with the predicted route larger than an image imitating another facility.

The information provision controller 140 may cause a part or all of information obtained from the displayed image IM2 to be output as sound from the speaker of the HMI 106, instead of (or in addition to) the displayed content described above.

Processing Flow

Figure 12:
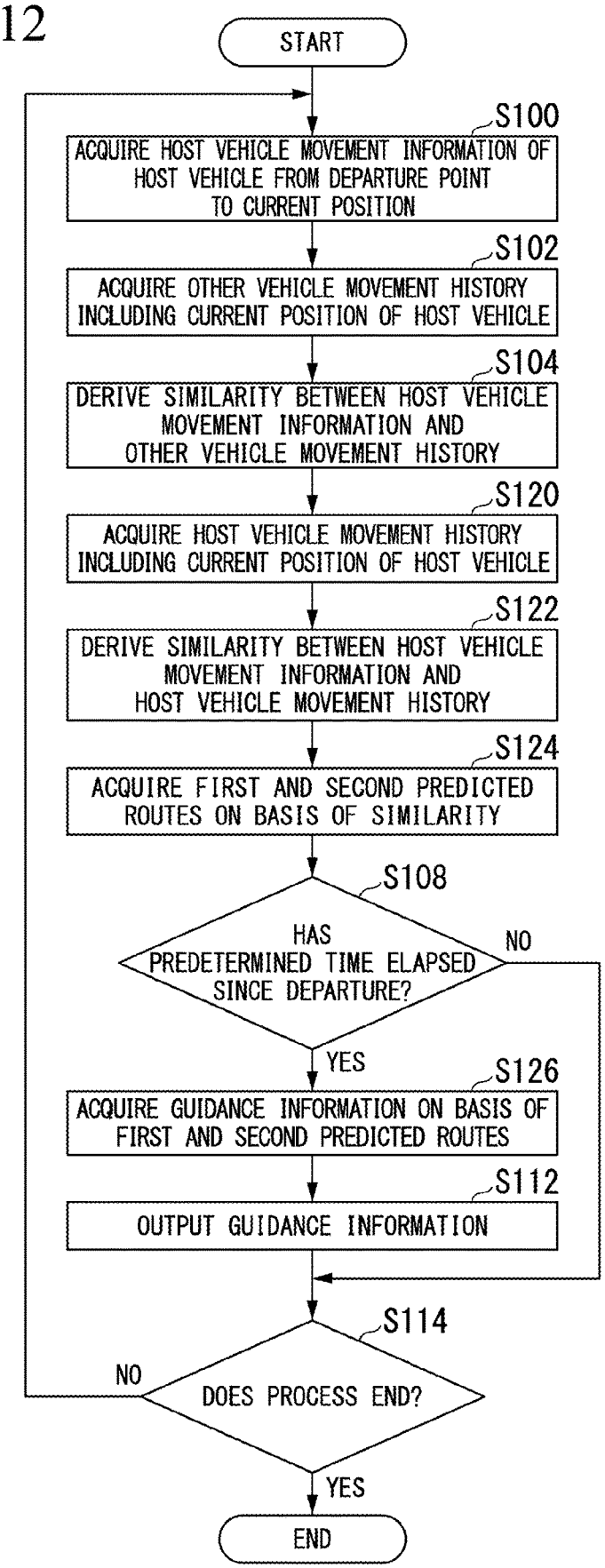
FIG. 12 is a flowchart illustrating a flow of a process that is executed by the guidance device according to the second embodiment.

FIG. 12 is a flowchart illustrating a flow of a process that is executed by the guidance device 100A according to the second embodiment. The process of FIG. 12 differs from the process of FIG. 8 described above in that the process of FIG. 12 includes processes of steps S120 to S126 instead of the processes of steps S106 and S110. Therefore, the following description will mainly focus on the processes of steps S120 to S126.

After the process of step S104, the host vehicle movement history acquirer 144 acquires the host vehicle movement history including the current position of the host vehicle M (step S120). Then, the route predictor 138A derives a similarity between the host vehicle movement information and the host vehicle movement history (step S122). Then, the route predictor 138A acquires the first and second predicted routes on the basis of the similarity (step S124).

In the process of step S108, when a predetermined time has elapsed since the departure, the information provision controller 140A acquires guidance information based on the first and second predicted routes (step S126), and performs processes after step S112. Although both the first and second predicted routes are output in the above-described process, information (for example, a route or guidance information) on the predicted route having a higher similarity may be output. In calculation of the similarity, for example, the host vehicle movement history that is information on the host vehicle M may be a preferential one as compared with the other vehicle movement history.

According to the second embodiment described above, it is possible to provide the second predicted route based on the movement history of the host vehicle M or the guidance information associated with the second predicted route, in addition to achieving the same effects as in the first embodiment. Thereby, it is possible to provide more appropriate guidance information to the occupant.

Modification Example

Each of the first and second embodiments described above may be combined with some or all of other embodiments. Some or all of functions of the guidance device 100 (and 100A, the same applies hereinafter) may be included in the server device 200. Some or all of functions of the server device 200 may be included in the guidance device 100. That is, the separation of functions in the guidance device 100 and the server device 200 may be appropriately changed according to components of each device, a scale of the server device 200 or the guidance system 1, or the like. The separation of the functions in the guidance device 100 and the server device 200 may be set for each vehicle (guidance device).

Specifically, for example, in the first embodiment, the map data 122 and the guidance information 124 may not be stored in the storage 120, and the map data 122 and the guidance information 124 may be acquired from the server device 200 at a timing when the information provision controller 140 provides the occupant with the map data or the guidance information. The functions of the other vehicle movement history acquirer 136 or the route predictor 138 may be provided in the server device 200.

In the process that is executed by the guidance device 100 illustrated in FIG. 8, after the process of step S100 is performed, the guidance device 100 may transmit (upload) the host vehicle movement information to the server device 200, and the processes of steps S102 to S106 may be executed by the server device 200. In this case, the guidance device 100 may perform a process of performing an inquiry of the server device 200 to acquire the guidance information based on the first predicted route when a predetermined time has elapsed since departure in the process of step S108 (corresponding to the process of step S110).

In the second embodiment, the map data 122, the guidance information 124, and the host vehicle movement history 126 may be not stored in the storage 120A, and may be acquired from the server device 200 at a timing when the information provision controller 140 provides the map data or the guidance information to the occupant. The functions of the other vehicle movement history acquirer 136, the route predictor 138A, and the host vehicle movement history acquirer 144 may be provided in the server device 200.

In the process that is executed by the guidance device 100A illustrated in FIG. 12, after the process of step S100 has been performed, the guidance device 100A may transmit (upload) the host vehicle movement information to the server device 200, and cause the processes of step S102 to S124 to be executed by the server device 200. In this case, the guidance device 100A may perform a process of performing an inquiry of the server device 200 when a predetermined time has elapsed since the departure, to acquire the guidance information based on the first and second predicted routes in the process of step S108 (corresponding to the process of S126). The separation of functions in the guidance device 100 and the server device 200 is not limited to the specific examples described above.

Although the guidance device 100 mainly mounted in the host vehicle M has been described in each of the above-described embodiments, the guidance device 100 is not limited to the host vehicle M, and may be mounted in, for example, a mobile body such as an aircraft such as a passenger plane, an airship, and a helicopter, or a ship such as a passenger ship. In this case, the other vehicle is the same type of mobile body as the host vehicle M.

Figure 13:
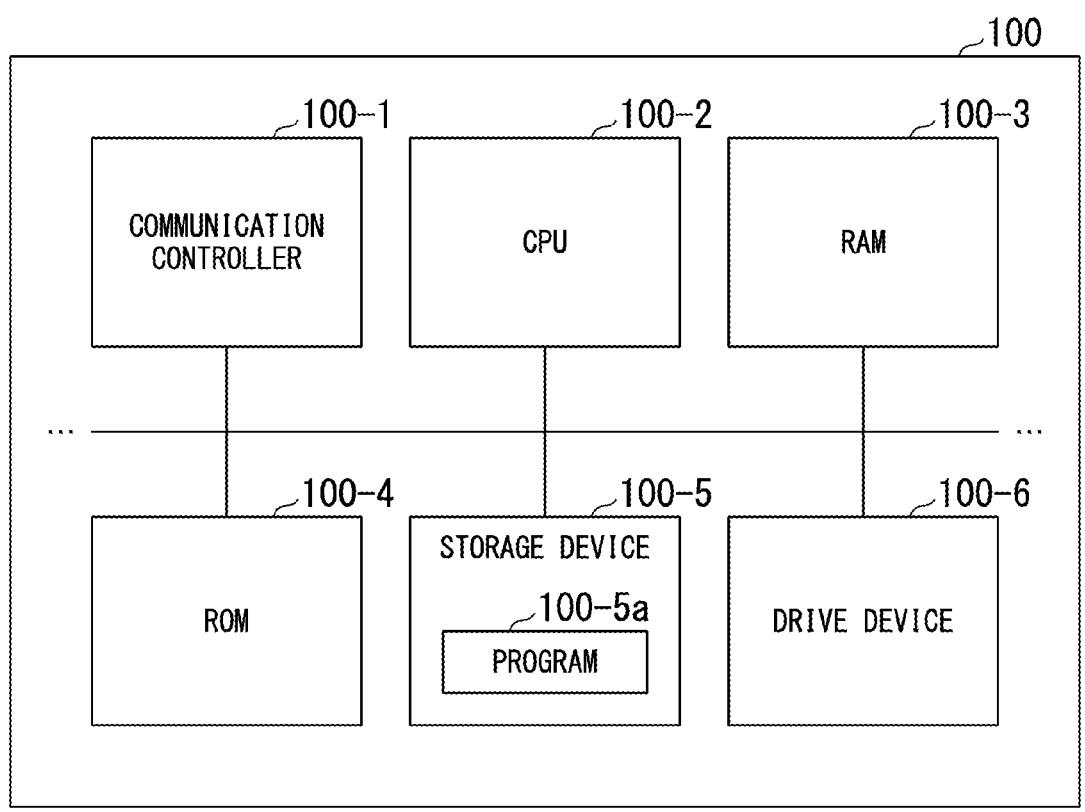
FIG. 13 is a diagram illustrating an example of a hardware configuration of the guidance device of the embodiment.

The configuration of the guidance device 100 described above may be applied to a terminal device that is used by a user. The terminal device is, for example, a smart phone, a tablet terminal, and other portable communication terminals. When the configuration of the guidance device 100 is applied to a terminal device, the terminal device is an example of the first mobile body, and cameras or various sensors mounted in the terminal device may be used instead of the vehicle sensor 102 described above. Position information of the terminal device is used as the position information of the host vehicle M. Terminal information obtained from the cameras or various sensors described above may be used instead of the vehicle information (the vehicle state data or the like), and the process of each embodiment described above is executed for the user of the terminal device described above. Thereby, it is possible to provide the user with appropriate guidance information for a target present around a route that the user passes by walking or running Hardware Configuration FIG. 13 is a diagram illustrating an example of a hardware configuration of the guidance device 100 according to the embodiment. Although the following description will be made using the guidance device 100 of the first embodiment, the same configuration can be applied to the guidance device 100A. As illustrated in FIG. 13, a computer of the guidance device 100 has a configuration in which a communication controller 100-1, a CPU 100-2, a RAM 100-3 that is used as a work memory, a ROM 100-4 that stores a boot program or the like, a storage device 100-5 such as a flash memory or an HDD, a drive device 100-6, and the like are connected to each other by an internal bus or a dedicated communication line. The communication controller 100-1 communicates with components other than the guidance device 100. A portable storage medium such as an optical disc (for example, a computer-readable non-transitory storage medium) is mounted in the drive device 100-6. A program 100-5a to be executed by the CPU 100-2 is stored in the storage device 100-5. This program is developed in the RAM 100-3 by a direct memory access (DMA) controller (not illustrated) or the like and executed by the CPU 100-2. The program 100-5a referred to by the CPU 100-2 may be stored in the portable storage medium mounted in the drive device 100-6 or may be downloaded from another device via a network. Thereby, some or all of the components of the guidance device 100 are realized.

The embodiment described above can be expressed as follows.

A guidance device including a storage device in which a program has been stored, and a hardware processor, wherein the hardware processor acquires first mobile body movement information of a first mobile body from a reference position to a first position, acquires a second mobile body movement history including a movement history including the first position in a movement history of a second mobile body, and causes an output to output guidance information directed to a user of the first mobile body on the basis of the first mobile body movement information and the second mobile body movement history, by executing the program stored in the storage device.

Although the form for implementing the present invention has been described using the embodiments, the present invention is not limited to such embodiment at all, and various modification and substitution can be made without departing from the gist of the present invention.

What is claimed is:

1. A guidance device, comprising:
a processor; and
a memory that stores instructions that, when executed by the processor, facilitates performance of operations, comprising:

acquiring first vehicle movement information of a first vehicle from a reference position to a first position;

acquiring a second vehicle movement history including a movement history including the first position in a movement history of a second vehicle; and causing an output to output guidance information directed to a user of the first vehicle based on the first vehicle movement information and the second vehicle movement history, wherein when a route to a destination or a specific travel route is not set in the first vehicle, causing the output to output a predicted route based on the first vehicle movement information and the second vehicle movement history, and causing the output to output the guidance information associated with the predicted route, the predicted route being prediction information of a route from the first position of the first vehicle.

2. The guidance device according to claim 1, wherein the operations further comprise curbing the output of the guidance information using the output until a movement time from the reference position is a predetermined time or more or a movement distance from the reference position is a predetermined distance or more.

3. The guidance device according to claim 1, wherein the operations further comprise:

acquiring the predicted route, and causing the output to output each of the predicted route and the guidance information associated with the predicted route.

4. The guidance device according to claim 3, wherein the operations further comprise in response to causing the guidance information to be output, causing the predicted route corresponding to the guidance information to be output in a display aspect different from those of other routes.

5. The guidance device according to claim 3, wherein the operations further comprise:

acquiring a first vehicle movement history including the first position in a movement history of the first vehicle, and acquiring the predicted route based on the first vehicle movement information, the second vehicle movement history, and the first vehicle movement history.

6. The guidance device according to claim 5, wherein the operations further comprise: acquiring the predicted route based on a similarity between the first vehicle movement information and the second vehicle movement history, and a similarity between the first vehicle movement information and the first vehicle movement history.

7. The guidance device according to claim 5, wherein the operations further comprise: acquiring the predicted route by preferentially using the second vehicle movement history when a data amount or accuracy of the first vehicle movement history does not satisfy predetermined conditions.

8. The guidance device according to claim 5, wherein the operations further comprise: causing the output to output a first predicted route based on the first vehicle movement information and the second vehicle movement history, and a second predicted route based on the first vehicle movement information and the first vehicle movement history in different output aspects.

9. The guidance device according to claim 5, wherein the first vehicle movement information, the second vehicle movement history, and the first vehicle movement history each include at least one piece of information among the weather, a date and time, and a day of a week, and wherein the operations further comprise deriving a similarity including the information and acquiring the predicted route based on the derived similarity.

10. The guidance device according to claim 1, wherein the guidance information includes information on things associated with the predicted route.

11. A guidance method causing a computer comprising a processor to:
acquire first vehicle movement information of a first vehicle from a reference position to a first position;
acquire a second vehicle movement history including a movement history including the first position in a movement history of a second vehicle;
cause an output to output guidance information directed to a user of the first vehicle based on the first vehicle movement information and the second vehicle movement history, and
when a route to a destination or a specific travel route is not set in the first vehicle, causing the output to output a predicted route based on the first vehicle movement information and the second vehicle movement history, and causing the output to output the guidance information associated with the predicted route, the predicted route being prediction information of a route from the first position of the first vehicle.

12. A non-transitory computer-readable medium storing a program, the program causing a computer comprising a processor to:
acquire first vehicle movement information of a first vehicle from a reference position to a first position;
acquire a second vehicle movement history including a movement history including the first position in a movement history of a second vehicle;
cause an output to output guidance information directed to a user of the first vehicle based on the first vehicle movement information and the second vehicle movement history, and
when a route to a destination or a specific travel route is not set in the first vehicle, causing the output to output a predicted route based on the first vehicle movement information and the second vehicle movement history, and causing the output to output the guidance information associated with the predicted route, the predicted route being prediction information of a route from the first position of the first vehicle.

* * * * *